June 9, 1959 L. E. HOYER 2,890,085
JOURNAL BEARING LUBRICATORS
Filed April 14, 1955

INVENTOR.
LLEWELLYN E. HOYER
BY Wallace and Cannon
ATTORNEYS

United States Patent Office 2,890,085
Patented June 9, 1959

2,890,085

JOURNAL BEARING LUBRICATORS

Llewellyn E. Hoyer, Wyckoff, N.J., assignor to American Brake Shoe Company, New York, N.Y., a corporation of Delaware Application April 14, 1955, Serial No. 501,332

5 Claims. (Cl. 308—87)

This invention relates to a lubricator for a railway journal bearing.

The journals for the wheels of railways cars are rotatably supported in a bearing in a journal box, and in those instances where the bearing takes the form of a standard journal bearing the conventional way for lubricating the journal in the past has been by oil soaked cotton or wool waste packed between the bottom of the journal box and the journal.

Lubricators for bearings of the foregoing kind other than waste packing have been proposed inasmuch as it is commonly believed that waste packing failures of one kind or another have accounted for hot boxes in many instances. Thus, while the waste packing when first packed into the box exerts a positive upward force against the journal, this force in effect is gradually reduced as the packing is compacted more and more by vertical vibration of the journal. Under circumstances where the ambient temperature is low, the packing displays some tendency to recover prior effectiveness after undergoing compaction, but under circumstances where the ambient temperature is relatively high, repeated compaction of the waste gradually takes on a permanent set such that eventually the journal rides free of the packing.

It will be recognized from the foregoing that due to vibration of the journal the tendency for the waste packing to hug the journal in an effective lubricating relation is gradually reduced, and it is believed that failure of this kind is one of the causes of hot boxes encountered where waste packing has been resorted to as the lubricator for the railway journal, and the primary object of the present invention is to overcome the tendency for waste packing to take on a permanent set as aforesaid by having resort to a rubber pad disposed between the bottom of the journal box and the waste packing so as to assure a relatively constant upward force of the waste packing against the journal. More specifically, it is an object of the present invention to hold waste packing in the journal box with a relatively constant upward force against the journal by means of a porous pad of oil-resistant sponge rubber such as Neoprene or the like, and to embody in this pad passages extended but part way therethrough so as to exert pressure upon oil or like lubricant in these passages when the waste packing and the pad undergo compaction, the arrangement being such that under this circumstance jets of lubricant will emit from the pad and into the waste packing to increase the lubricating effect on the journal.

Other and further objects of the present invention will be apparent from the following description and claims and are illustrated in the accompanying drawings which, by way of illustration, show the preferred embodiment of the present invention and the principle thereof and what I now consider to be the best mode in which I have contemplated applying that principle. Other embodiments of the inventions embodying the same or equivalent principles may be used and structural changes may be made as desired by those skilled in the art without departing from the present invention and the purview of the appended claims.

Figure 1:
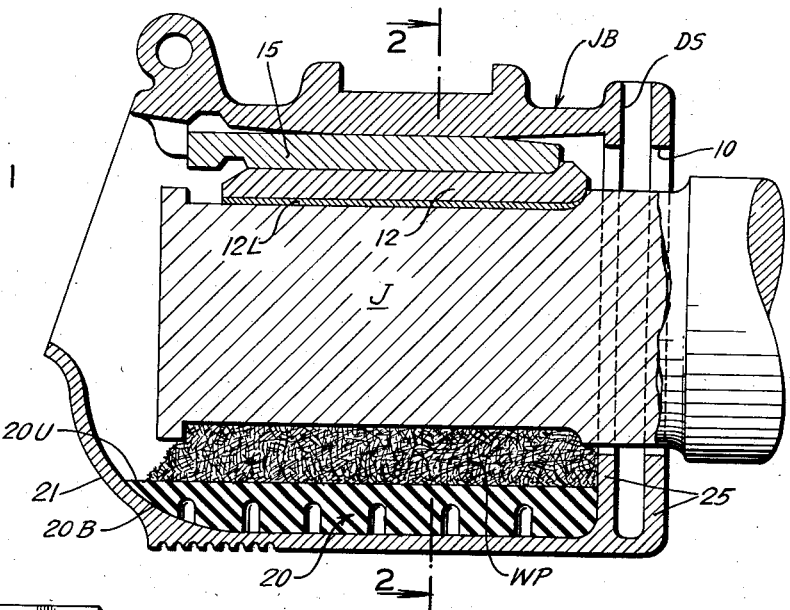
Fig. 1 is a sectional view through a journal box showing the journal and the lubricator of the present invention disposed therein.

In Fig. 1 there is shown a journal box JB of conventional construction well known in the art, and at the end of the journal box adjacent the car wheel there is provided the usual opening 10 of relatively large diameter enabling the journal J of the car to be extended into the journal box.

A standard AAR steeple back bearing 12 of well known construction is arranged in the top of the journal box so that the bearing lining 12L of Babbitt metal or the like, on the inwardly disposed face thereof rotatably supports the upper peripheral portion of the journal J.

Figure 2:
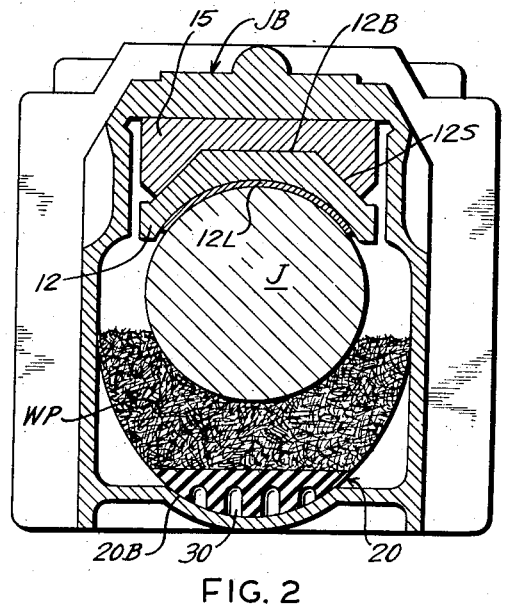
Fig. 2 is a sectional view, part in elevation, taken substantially on the line 2—2 of Fig. 1.
Figure 5:
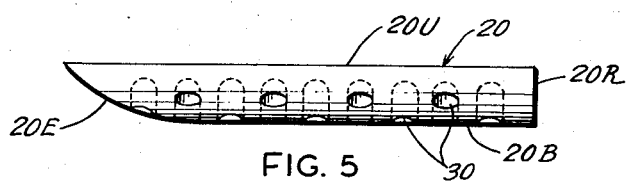
Fig. 5 is a side elevation of the lubricator pad shown in Fig. 4.

The bearing 12 is cast with a conventional back 12B, Fig. 2, and outwardly sloped side portions 12S extending downwardly therefrom. A complemental wedge 15 of the usual kind configured complementary to the back and side portions 12B and 12S of the bearing 12 is arranged at the top of the box JB to hold the bearing in position in the usual way within the journal box.

In accordance with conventional lubricating practice for bearings of the foregoing kind, cotton or wool waste packing WP is disposed in the cavity of the journal box JB that underlies the lower peripheral portion of the journal, and such packing is adapted to be heavily soaked with lubricant in the bottom of the box so that when the car is in motion the oil soaked waste WP in effect constantly wipes the rotating journal J which carried a film of lubricant around to the lining 12L of the bearing.

Under and in accordance with the present invention, the waste packing WP is held firmly against the lower peripheral portion of the journal J with a relatively constant upward force exerted by a highly resilient rubber pad 20 of sponge rubber such as Neoprene or the like. As shown in Figs. 1 and 2, the pad 20 is configured complementary to the interior of the bottom wall of the journal box, and to this end is formed with a rounded bottom wall 20B that engages the corresponding rounded bottom wall of the journal box. The forward end of the pad 20 is rounded upwardly at 20E so as to be flush with the rounded end wall 21 of the journal box which is opposite the end wall of the journal box through which the journal J is passed, and from the foregoing it will be seen that the nature of the pad 20 is such to be fully flush in all respects with the corresponding portions of the bottom of the journal box.

Preferably, the axial dimension of the pad 20 is such that the rear end 20R thereof engages the forward one of the axially spaced flanges 25 which cooperate to afford the usual dust guard slot DS at the inner end of the journal box, and in this way assurance is had that the pad 20 is retained against lateral or longitudinal displacement.

As shown in Figs. 1 and 2, the upper wall 20U of the pad 20 is flat and is spaced from the lower peripheral portion of the journal J sufficiently to enable a substantial quantity of waste packing WP to be packed into the journal box between the upper wall of the pad 20 and the lower peripheral portion of the journal J. The thickness of the pad 20 is selected so that the waste packing thus afforded for lubricating the journal is held firmly with a positive upward force against the lower peripheral portion of the journal. While this dimension may vary, I have found that a thickness of one to one and one-fourth inches to be adequate, and inasmuch as the journal box and conventional appurtenances associated therewith are of a standard A.A.R. dimension, it is believed that tolerable variations from the foregoing will be apparent to those skilled in the art.

The pad 20 assures that the compressible waste packing WP does not take on a permanent set due to compaction engendered by relative downward movement or vibration of the journal J within the journal box, that is, the sponge pad 20 of sponge Neoprene or the like will assure recovery of the waste packing WP in those instances where movement of the journal J tended to compress the pad 20 and at the same time compact the waste packing WP.

Figure 3:
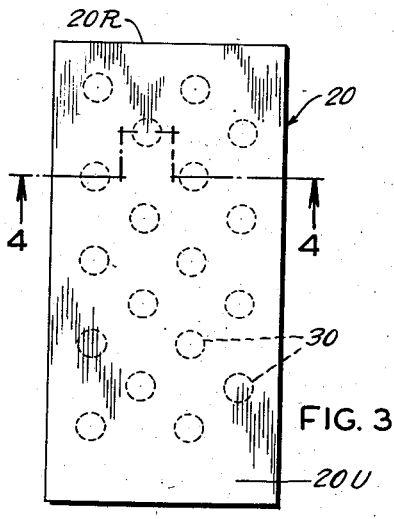
Fig. 3 is a top plan view of the lubricator pad of the present invention.
Figure 4:
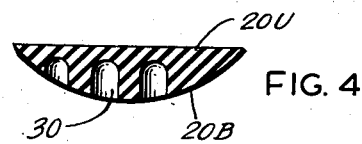
Fig. 4 is a sectional view taken substantially on the line 4—4 of Fig. 3.

Preferably the lower wall of the pad 20 is cored or otherwise provided with a plurality of enlarged passages 30 extended but part way through the body of the pad so that these passages have dead ends terminating within the pad 20 below the upper wall 20U which supports the waste packing. As shown in Fig. 3, these passages are randomly distributed laterally and longitudinally of the pad 20. The usual practice is to periodically renew the supply of lubricant in the bottom of the journal box, and it will be appreciated that the pad 20, being of porous nature, will absorb a relatively large quantity of such lubricant and that quantities of lubricant will ordinarily be trapped in the passages 30 of the pad 20. Where the sponge pad 20 is of the open-cell type, compression of the pad as described above will place the lubricant in the passages 30 under pressure so that individual jets of lubricant will emit through the upper wall of the pad 20 and into the waste packing WP thereby enlarging the lubricating effect in those instances where motion of the car accounts for relative downward movement of the journal J within the box JB as viewed in Fig. 1.

The pad 20 may also be of the closed-cell type in contrast to the open-cell type described above, and to achieve the jet lubricating effect with a pad 20 of the closed-cell type it is necessary that the upper wall of the pad 20 over the passages 30 be punctured to afford capillary openings for jetting lubricant into the packing WP as described above.

It will be seen from the foregoing that in accordance with the present invention, conventional waste packing may be resorted to for lubricating the journal of a railway car under circumstances such that the tendency for the packing to be permanently set and ride free of the journal is resisted by a lubricator return pad that presses or holds the waste packing against the journal with a relatively constant upward force.

Thus, while I have illustrated and described the preferred embodiment of my invention, it is to be understood that this is capable of variation and modification, and I therefore do not wish to be limited to the precise details set forth, but desire to avail myself of such changes and alterations as fall within the purview of the following claims.

I claim:
1. In a journal box rotatably supporting the journal of a railway car, a lubricator comprising, waste packing at the bottom of the box beneath the journal for lubricating the journal by direct engagement therewith, and a pad of oil-resistant cellular sponge material conforming to the shape of the inside bottom wall of the journal box and disposed between the journal and the bottom of the journal box for pressing the waste packing with a relatively constant upward force against the journal, said pad being formed in the side adjacent the bottom of the journal box with a plurality of spaced apart enlarged passages of greatly enlarged transverse dimension in comparison to the cells of the pad and extended but part way through the body of the pad in the direction of the opposed side of the pad adjacent the waste packing, said enlarged passages having dead ends within the body of the pad, and said pad having jet openings of restricted size in comparison to the transverse dimension of said enlarged passages extended from the dead ends of said enlarged passages to said opposed side of the pad so that lubricant within said enlarged passages when the pad is compressed in the journal box will be placed under pressure and jetted through said jet openings in the pad in relatively large quantities on to the waste packing.

2. A lubricator according to claim 1 wherein the jet openings are afforded by open cells of the pad.

3. A lubricator according to claim 1 wherein the jet openings are afforded by punctures in the pad.

4. An auxiliary lubricating and pressure pad adapted to be disposed in a railroad journal box between the bottom wall of the railroad journal box and waste packing in the box below the journal of a railway car axle extended into the journal box and comprising: a body portion having an upper wall engageable with such waste packing, a lower wall and inner and outer end walls, said body portion of the pad being of oil-absorbent oil-resistant material, the lower wall only of said body portion having a plurality of spaced apart passages formed therein of relatively large transverse dimension in which oil in the journal box will be trapped, said passages having dead ends terminating within the body portion of the pad and spaced from the upper wall of the body portion of the pad, and said body portion of the pad having jet openings of greatly restricted size in comparison to the transverse dimension of said passages extended from the dead ends of said passages through the overlying body portion of the pad to said upper wall so that oil trapped as aforesaid and subjected to pressure will emit as jet sprays through said jet openings.

5. A pad according to claim 4 wherein said upper wall is substantially flat, the bottom wall is of rounded contour, and said inner end wall is disposed in a plane substantially normal to the plane of the upper wall.

References Cited in the file of this patent

UNITED STATES PATENTS

| | | |
|---|---|---|
| 1,302,021 | Downing et al. | Apr. 29, 1919 |
| 2,134,872 | Grece | Nov. 1, 1938 |
| 2,138,971 | Keller et al. | Dec. 6, 1938 |
| 2,291,483 | Miller | July 28, 1942 |
| 2,581,020 | Hulson | Jan. 1, 1952 |
| 2,657,958 | Tagliaferri et al. | Nov. 3, 1953 |
| 2,742,331 | Hamer | Apr. 17, 1956 |